United States Patent [19]

Wain et al.

[11] 4,063,976

[45] Dec. 20, 1977

[54] PLASTERBOARD MANUFACTURE

[75] Inventors: Alan James Bradley Wain, West Bridgford; Frank Lyn Boot, Wilford; John Eric Baines, all of Woodthorpe,, England

[73] Assignee: BPB Industries Limited, London, England

[21] Appl. No.: 586,810

[22] Filed: June 13, 1975

[30] Foreign Application Priority Data

June 13, 1974 United Kingdom ............... 26321/74

[51] Int. Cl.$^2$ ....................... B32B 31/12; B32B 13/08
[52] U.S. Cl. ........................ 156/44; 156/90; 427/326
[58] Field of Search ....................... 156/39, 41, 44, 90; 106/114; 427/326; 428/539

[56] References Cited

U.S. PATENT DOCUMENTS

| | | | |
|---|---|---|---|
| 3,137,588 | 6/1964 | Taylor | 428/539 |
| 3,307,987 | 3/1967 | Bieri | 156/41 |
| 3,389,042 | 6/1968 | Bieri et al. | 156/44 |
| 3,425,896 | 2/1969 | Hart | 428/539 |

OTHER PUBLICATIONS

May, Michael, Water Repellent Finishes, in American Dyestuff Reporter, vol. 58, pp. 15-19, 45, Oct. 6, 1969.

*Primary Examiner*—Charles E. Van Horn
*Assistant Examiner*—W. H. Thrower
*Attorney, Agent, or Firm*—Birch, Stewart, Kolasch and Birch

[57] ABSTRACT

Satisfactory or enhanced dry bond between the gypsum core of plasterboard and paper facing sheets is achieved by treatment of at least the inner faces of the paper sheets with a water soluble zirconium salt before contacting the sheets with a core slurry containing gypsum plaster and starch as a dry bond assistant. The preferred zirconium salt is zirconium acetate although other salts such as oxychloride, nitrate and sulphate can also be used. The preferred level of zirconium is from 1 to 2 g. per square meter of paper, expressed as zirconium dioxide, and excellent dry bonds are formed with as little as 0.2% starch by weight of core solids, which represents an important economy in the use of starch.

13 Claims, No Drawings

PLASTERBOARD MANUFACTURE

The present invention relates to the manufacture of plasterboard.

In the manufacture of plasterboard an aqueous slurry of gypsum plaster is deposited on a continuously advancing lower sheet of paper, which forms the front face and edges of the finished board. An advancing upper sheet, which forms the rear face of the board, is laid over the slurry and bonded by means of an adhesive to the inwardly folded side edges of the lower sheet. The slurry is pressed to the desired thickness and sets to form a solid gypsum core.

It is necessary that there should be an adequate bond between the gypsum core and the facing sheets and in this connection two circumstances are of particular interest. After the plasterboard has been formed it must be dried and it is customary to cut the board into lengths for drying. At this stage a bond between gypsum and paper is required — the "wet bond" — which is capable of withstanding the cutting operation. After being dried, the plasterboard should have an adequate bond between the paper and core — the "dry bond" — to prevent delamination in use.

It is known to add a small percentage of starch to the plaster slurry, the starch migrating towards and partially into the papers during the drying stage of manufacture, its presence promoting the formation of the dry bond between the paper and core.

It has now been found, in accordance with this invention, that by applying a water-soluble zirconium salt to the inner or bonding ply of the paper used in the production of plasterboard more efficient use is made of starch. Consequently, the quantity of starch employed can be substantially reduced, without impairment of the dry bond. The zirconium salt reduces the migration into the paper of the starch thereby causing it to be concentrated at the plaster/paper interfaces, thus enhancing the effect of the starch establishing the dry bond.

The preferred zirconium salt is zirconium acetate, but zirconium oxychloride, zirconium nitrate and zirconium sulphate are all effective to varying degrees.

The preferred procedure is to apply a solution of the zirconium salt to the inner or bonding faces of the paper sheets immediately before contact with the gypsum plaster slurry by means of suitable applicators associated with the plasterboard production line, the plaster slurry containing starch in the usual way, although it can be at a lower percentage than hitherto found to be necessary.

It is also preferred that the paper employed should carry less than the usual amount of conventional size, e.g., rosin/alum, on the bonding face, or that this face should be completely unsized. Satisfactory results can be obtained with normally-sized paper in the process of this invention when the paper is fresh, but when such paper is aged it is less satisfactory and the amount of zirconium salt required may vary. The use of a softly sized or unsized paper ensures predictable operation of the invention and is economical in reducing the cost of the paper.

The amount of zirconium salt required for the purposes of the invention is not critical. In general, the more zirconium applied, the better the resulting dry bond with a given starch level in the slurry. Satisfactory results have been obtained with application rates of zirconium acetate as low as 18 g/m² of plasterboard (0.9 g/m² of each of the paper sheets) expressed as $ZrO_2$. Consistently good results have been obtained with zirconium levels of from 1.0 g/m² up to 2.0 g/m² of paper, expressed as $ZrO_2$. If, however, an excessive quantity of zirconium salt is applied, as by the application of undiluted commercial zirconium acetate (about 22% $ZrO_2$), the wet bond is impaired and this in turn will affect the quality of the dry bond.

The following are examples of the application of the invention and of the results achieved.

EXAMPLE 1

A plasterboard-liner paper having a softly sized bond ply was spray-coated on the bonding face with a dilute aqueous solution of zirconium acetate obtained by 3:1 by volume dilution with water of a zirconium acetate solution containing 22% zirconium oxide. The application level of zirconium acetate was 1.0–1.1 g/m² of paper, expressed as $ZrO_2$. Immediately thereafter it was used to make a sample of plasterboard from a slurry of gypsum plaster containing 0.25% starch by weight of core solids. The wet bond of the plasterboard was assessed after the plaster core had set. After the plasterboard had been dried its dry bond strength was determined both in the dry condition and after being conditioned for 3 hours in an atmosphere of 90% R.H, at 20° C.

The bond assessment results are shown in Table 1 and are compared with those obtained from board produced with untreated conventionally sized liner papers and a similar plaster slurry which was conventional except that it contained only 0.25% starch by weight of core solids.

Table 1

| Paper Type | Wet Bond | Dry Bond * | Conditioned Dry Bond * |
|---|---|---|---|
| Normal liner: | | | |
| upper | Excellent at | 65 | 0 |
| lower | 1 minute after final set | 80 | 20 |
| Softly-sized liner + zirconium acetate: | Excellent at | | |
| upper | 2 minutes after | 100 | 90 |
| lower | final set | 95 | 65 |

* Dry bond is assessed as a visually estimated percentage coverage of core with paper after stripping the liner, (a) immediately after drying - Dry Bond - and (b) after humidifying for 3 hours at 90% RH 20° C - Conditioned Dry Bond.

It will be noted that, using an abnormally low starch concentration, the dry bond is enhanced by the use of zirconium acetate. Moreover, after humidification, the conditioned dry bond is entirely satisfactory and markedly superior to that given by normal liners at the same low starch concentration.

EXAMPLE 2

The experiments of Example 1 were repeated but employing a gypsum plaster slurry containing only 0.2% starch by weight of core solids. Very good dry bonds were obtained and it was observed that also the wet bonds were good.

EXAMPLE 3

The experiments of Example 1 were repeated but using 0.2% starch by weight in the gypsum core of the bond and softly sized paper liners which had been spray-coated on the bonding face with a dilute aqueous solution of zirconium oxychloride to a level of 0.9 to 1.0 g/m² of paper, expressed as $ZrO_2$. The bond assessments were carried out as in Example 1 with the following results.

Table 2

| Paper Type | | Wet Bond | Dry Bond | Conditioned Dry Bond |
|---|---|---|---|---|
| Normal liner: | | | | |
| | upper | Excellent at | 70 | 5 |
| | lower | 1 minute after final set | 65 | 5 |
| Softly-sized liner + zirconium oxychloride: | | Excellent at | | |
| | upper | 1 minute after | 100 | 55 |
| | lower | final set | 95 | 60 |

EXAMPLE 4

An experiment was carried out on conventional full-scale plant for manufacturing plasterboard. Zirconium acetate solution in the form of commercial zirconium acetate solution (22% $ZrO_2$) diluted 2:1 by volume with water, was applied to the bonding plies of both upper and lower papers as they were being used to make plasterboard of 1200 mm width. The application rate was equivalent to 1.1 g zirconium oxide per square meter of paper.

The zirconium acetate solution was metered from a storage tank to manifolds, which had been provided with taps. The solution was allowed to drip from the taps directly onto each paper as it was advanced for formation of the board, and was spread to an even application by passing each paper beneath a fixed cylindrical bar.

The plant was operated successfully using a starch content of 0.2% by weight in the slurry and bond assessments on the plasterboard showed it to be quite satisfactory. This represents a substantial reduction in the concentration of starch necessary for a good dry bond.

In contrast, the bond with normal paper without zirconium treatment and a similarly low starch level was found to be of inferior quality. The use of soft sized paper without the zironium treatment gives even poorer results, owing to excessive migration of starch into the paper.

We claim:

1. A method of making plaster or gypsum board in which a core is formed from an aqueous slurry of calcium sulphate plaster disposed between paper sheets, said slurry including starch employed as a dry bond assistant, characterized in that the faces of the paper sheets which are to contact the slurry are treated with a solution consisting of water-soluble zirconium salt and a solvent therefor whereby migration of the starch into the paper is reduced.

2. In a method of making gypsum plasterboard by the steps of forming an aqueous slurry of calcium sulphate plaster, including starch as a dry bond assistant therefor, encasing the slurry between paper sheets, allowing said slurry to set to form a core and drying said board, the improvement which comprises applying to at least those faces of the paper sheets that contact the slurry, a solution consisting of a water-soluble zirconium salt and a solvent therefor, and contacting said sheets with said slurry during manufacture of the board, the use of said zirconium salt enabling a reduction to be made in the amount of starch required in the plaster slurry to produce an adequate dry bond.

3. The method according to claim 2, characterized in that an aqueous solution of the salt is applied to the said faces of the paper sheets immediately before they are brought into contact with the slurry.

4. A method according to claim 2 characterized in that the ply of each paper sheet that contacts the slurry is soft sized or unsized.

5. The method according to claim 2 characterized in that the zirconium salt is zirconium acetate.

6. The method according to claim 5 characterized in that the zirconium salt, in a quantity of at least 0.9 g/m$^2$, expressed as zirconium dioxide, is applied as an aqueous solution to the said faces of the paper sheets before they contact the slurry.

7. A method according to claim 6 characterized in that the zirconium salt, in a quantity of from 1 to 2 g/m$^2$, expressed as zirconium dioxide, is applied to the said paper faces.

8. A method according to claim 7 characterized in that the slurry contains about 0.2% starch by weight of core solids.

9. In a method of making plaster or gypsum board by the steps of forming an aqueous slurry of calcium sulphate plaster, including starch as a dry bond assistant therefor, encasing the slurry between paper sheets, allowing said slurry to set to form a core and drying said board, the improvement which comprises applying to at least those faces of the paper sheets that contact the slurry, a solution consisting of a water-soluble zirconium salt and a solvent therefor, and contacting said sheets with said slurry during manufacture of the board, thereby causing said zirconium to inhibit migration of said starch whereby a dry bond between said sheets and said core can be achieved at a reduced level of starch in said slurry.

10. The method of claim 9 wherein the zirconium salt is selected from the group consisting of zirconium acetate, zirconium oxychloride, zirconium nitrate and zirconium sulphate.

11. In a method of making gypsum plasterboard by the steps of forming an aqueous slurry of calcium sulphate plaster, including starch as a dry bond assistant therefor, encasing the slurry between paper sheets, allowing said slurry to set to form a core and drying said board, the improvement which comprises applying to at least those faces of the paper sheets that contact the slurry, a solution consisting of a water-soluble zirconium salt and a solvent therefor, and substantially immediately thereafter contacting said sheets while still wet from said solution with said slurry to manufacture said board, the use of said zirconium salt enabling a reduction to be made in the amount of starch required in the plaster slurry to produce an adequate dry bond.

12. In a method of making gypsum plasterboard by the steps of forming an aqueous slurry of calcium sulphate plaster, including starch as a dry bond assistant therefor, encasing the slurry between paper sheets, allowing said slurry to set to form a core and drying said board, the improvement which comprises using as said sheets, paper wherein the face that contacts said slurry is soft sized or substantially unsized, applying to at least those faces of the paper sheets that contact the slurry a solution consisting of a water soluble zirconium salt and a solvent therefor and contacting said sheets with said slurry during manufacture of the board, the use of said zirconium salt enabling a reduction to be made in the amount of starch required in the plaster slurry to produce an adequate dry bond.

13. In a method of making plaster or gypsum board by the steps of forming an aqueous slurry of calcium sulphate plaster, including starch as a dry bond assistant therefor, encasing the slurry between paper sheets, allowing said slurry to set to form a core and drying said board, the improvement which comprises using as said sheets, paper wherein the face that contacts said slurry is soft sized or substantially unsized, applying to at least said face of said sheets a solution consisting of a water-soluble zirconium salt and a solvent therefor and substantially immediately thereafter contacting said sheets while still wet from said solution with said slurry to manufacture said board, thereby causing said zirconium to inhibit the migration of said starch whereby a dry bond between said sheets and said core can be achieved at a reduced level of starch in said slurry.

* * * * *